US006971005B1

(12) United States Patent
Henry et al.

(10) Patent No.: US 6,971,005 B1
(45) Date of Patent: *Nov. 29, 2005

(54) MOBILE HOST USING A VIRTUAL SINGLE ACCOUNT CLIENT AND SERVER SYSTEM FOR NETWORK ACCESS AND MANAGEMENT

(75) Inventors: Paul Shala Henry, Holmdel, NJ (US); Zhimei Jiang, Eatontown, NJ (US); Hui Luo, Marlboro, NJ (US); Frederick Kenneth Schmidt, Jr., Califon, NJ (US)

(73) Assignee: AT&T Corp., New York, NY (US)

( * ) Notice: Subject to any disclaimer, the term of this patent is extended or adjusted under 35 U.S.C. 154(b) by 812 days.

This patent is subject to a terminal disclaimer.

(21) Appl. No.: 10/017,533

(22) Filed: Oct. 23, 2001

Related U.S. Application Data

(60) Provisional application No. 60/269,919, filed on Feb. 20, 2001.

(51) Int. Cl.[7] ............................................... H04L 9/00

(52) U.S. Cl. ...................................... 713/155; 713/202

(58) Field of Search ................................. 713/155, 202

(56) References Cited

U.S. PATENT DOCUMENTS

| 5,572,528 | A | | 11/1996 | Shuen | |
|---|---|---|---|---|---|
| 5,944,824 | A | * | 8/1999 | He ............................. | 713/201 |
| 6,178,511 | B1 | * | 1/2001 | Cohen et al. ............... | 713/201 |
| 6,275,939 | B1 | * | 8/2001 | Garrison ..................... | 713/200 |

OTHER PUBLICATIONS

Netscape's Single Sign-On Technique. http://developer.netscape.com/docs/manuals/security/SSO/contents.htm Copies attached: two pages.
Novell's Single Sign-On Technique. http://www.novell.com/products/sso/ Copies attached: one page.
Computer Associates's eTrust Single Sign-On Technique. http://www3.ca.com/Solutions/Product.asp?ID=166 Copies attached: two pages.
Microsoft's Universal Single Sign-IN Technique Based On Passport http://www.microsoft.com/presspass/press/2001/Sept01/09-20 PassportFederationPR.asp Copies attached: three pages.
Evidian's AccessMaster SSO http://www.evidian.com/accessmater/sso/ Copies attached: two pages.
Open Group's Single Sign-On Specification http://www.opengroup.org/security/sso/ Copies attached: one page.

* cited by examiner

Primary Examiner—Gilberto Barrón, Jr.
Assistant Examiner—Venkat Perungavoor

(57) ABSTRACT

A Virtual Single Account (VSA) system that provides a mobile user with automatic authentication and connection to a remote network via local access networks with a single password, where the local access networks may be independent of the remote network. A mobile user has a single authentication credential for one VSA that is utilized by a VSA client installed on a mobile computing device. The VSA client provides for automatically authenticating and connecting the user's mobile device to a current local access network, and the target remote network such as the user's office network. All authentication credentials are encrypted using a key generated from the user's VSA password that is generated from the user's single password. The VSA client derives the key from the submitted VSA password and decrypts all authentication credentials that are required in order to connect the mobile device to the current local access network and thereafter to the office network.

15 Claims, 15 Drawing Sheets

| | |
|---|---|
| LOCAL ACCESS NETWORK ID | 502 |
| LOCAL ACCESS METHOD (WEB, WEP, 802.1x, NONE, BINARY, etc) | 504 |
| LOCAL ACCESS AUTHENTICATION CREDENTIAL | 506 |
| LOCAL ACCESS MANAGEMENT METHOD (MANUAL, WEB, BINARY, etc) | 508 |
| LOCAL AAA SERVER NAME AND/OR IP ADDRESS | 510 |
| LOCAL ACCESS MANAGEMENT AUTHENTICATION CREDENTIAL | 512 |

| | |
|---|---|
| REMOTE NETWORK ID | 602 |
| VSA SERVER NAME AND/OR IP ADDRESS | 604 |
| VSA USERNAME | 606 |
| VSA PASSWORD | 608 |
| SYNCHRONIZATION TIME | 610 |
| NUMBER OF LOCAL ACCESS RECORDS | 612 |
| 1st LOCAL ACCESS RECORD | |
| 2nd LOCAL ACCESS RECORD | 614 |
| ⋮ | |

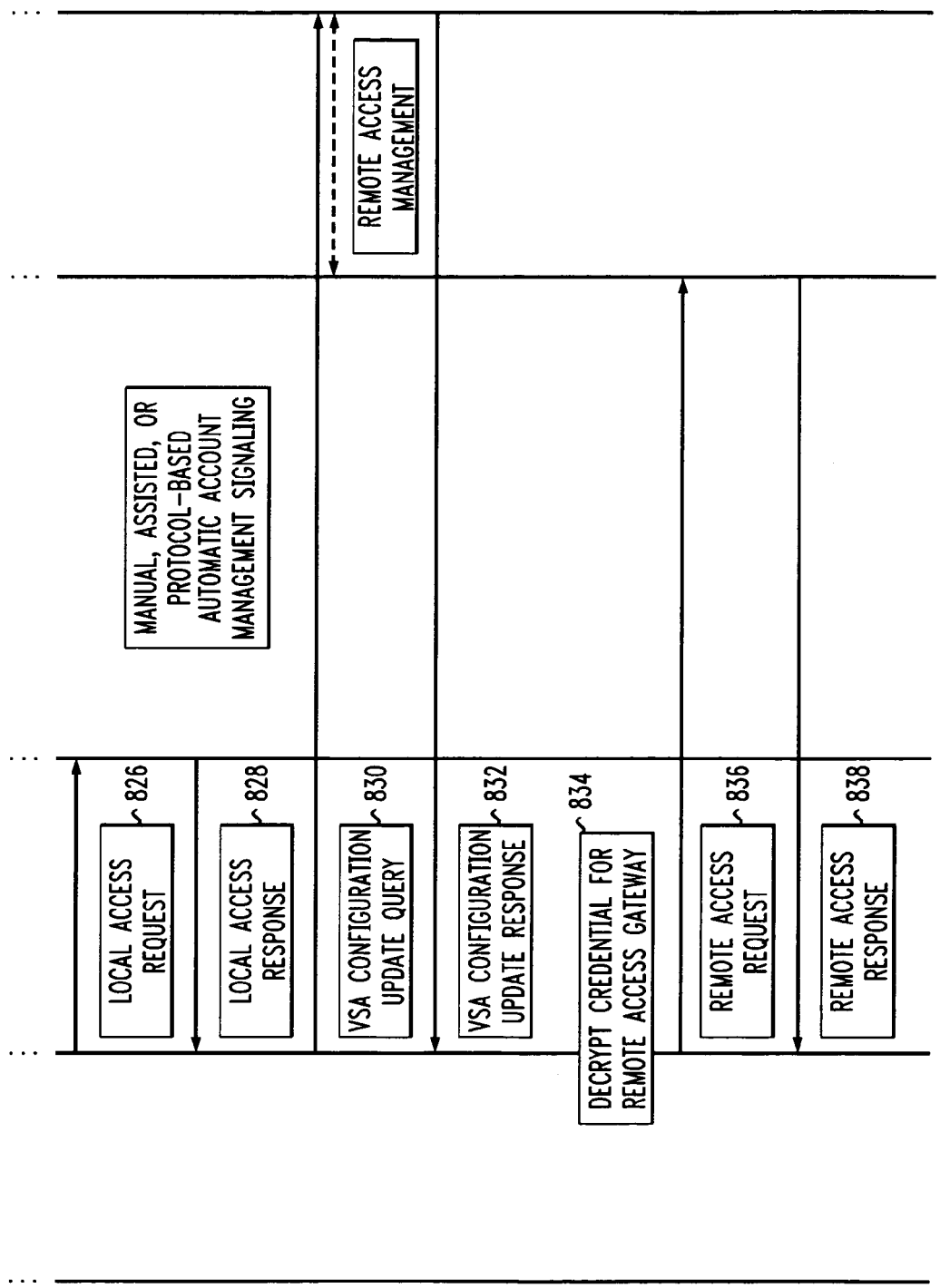

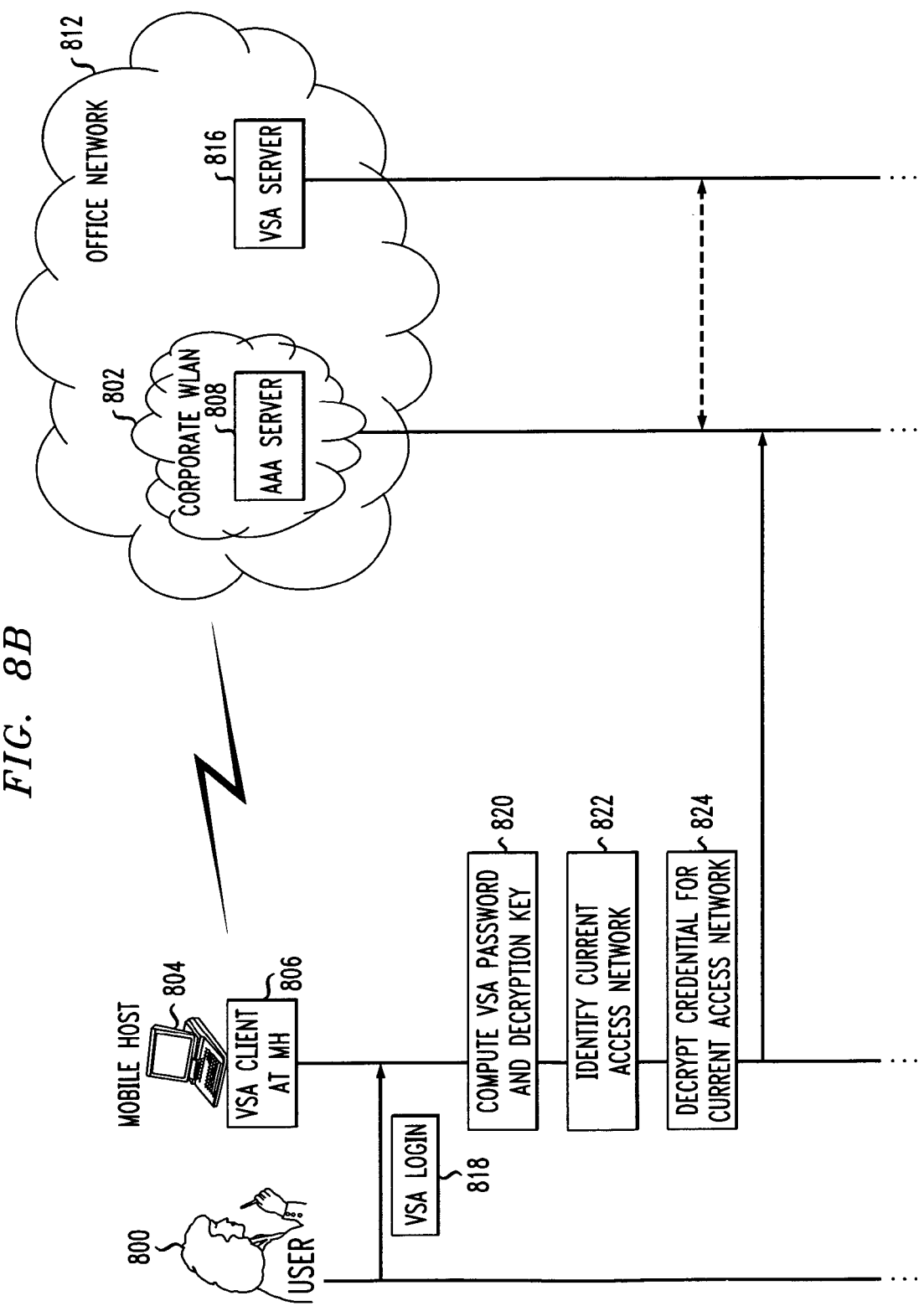

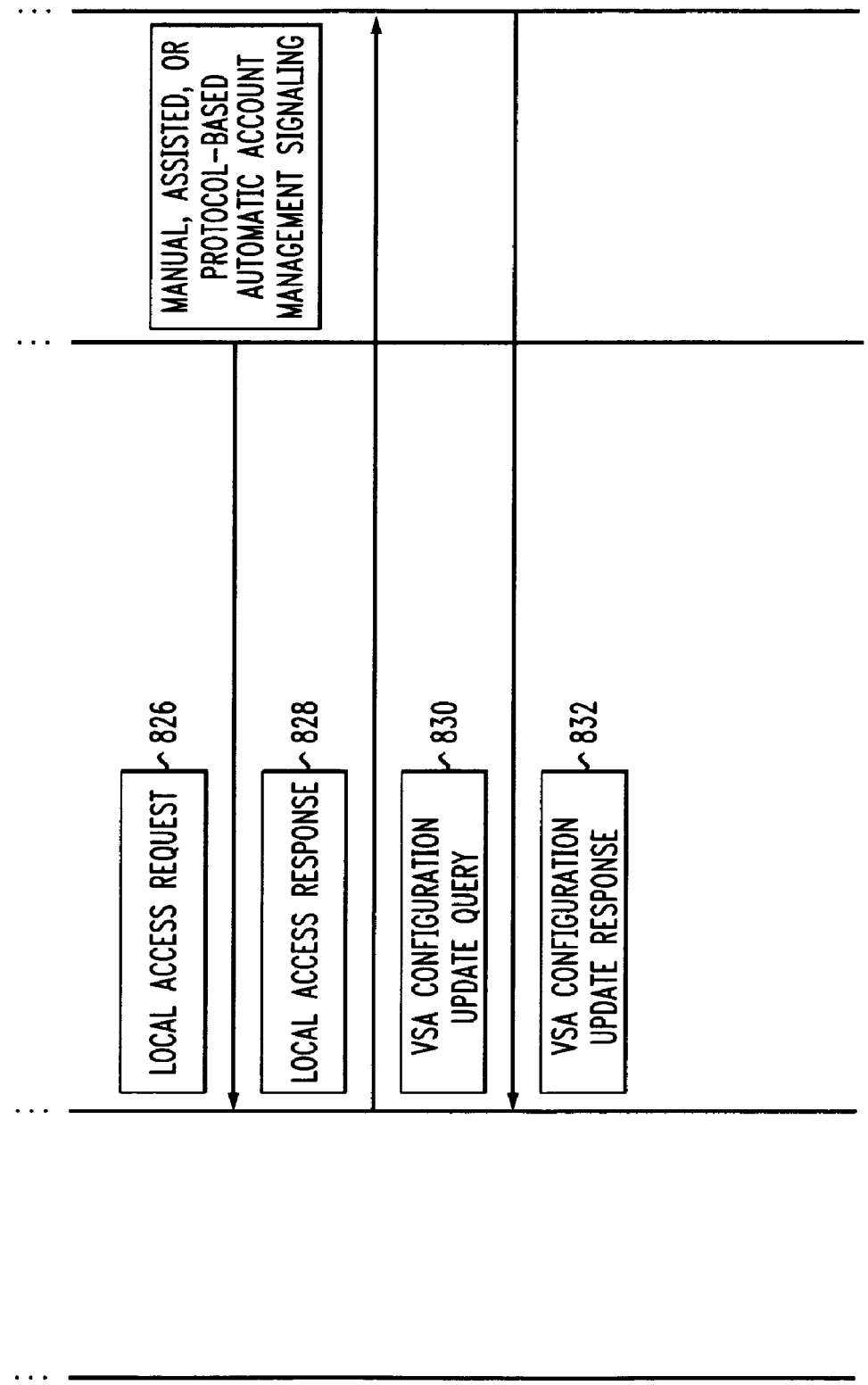

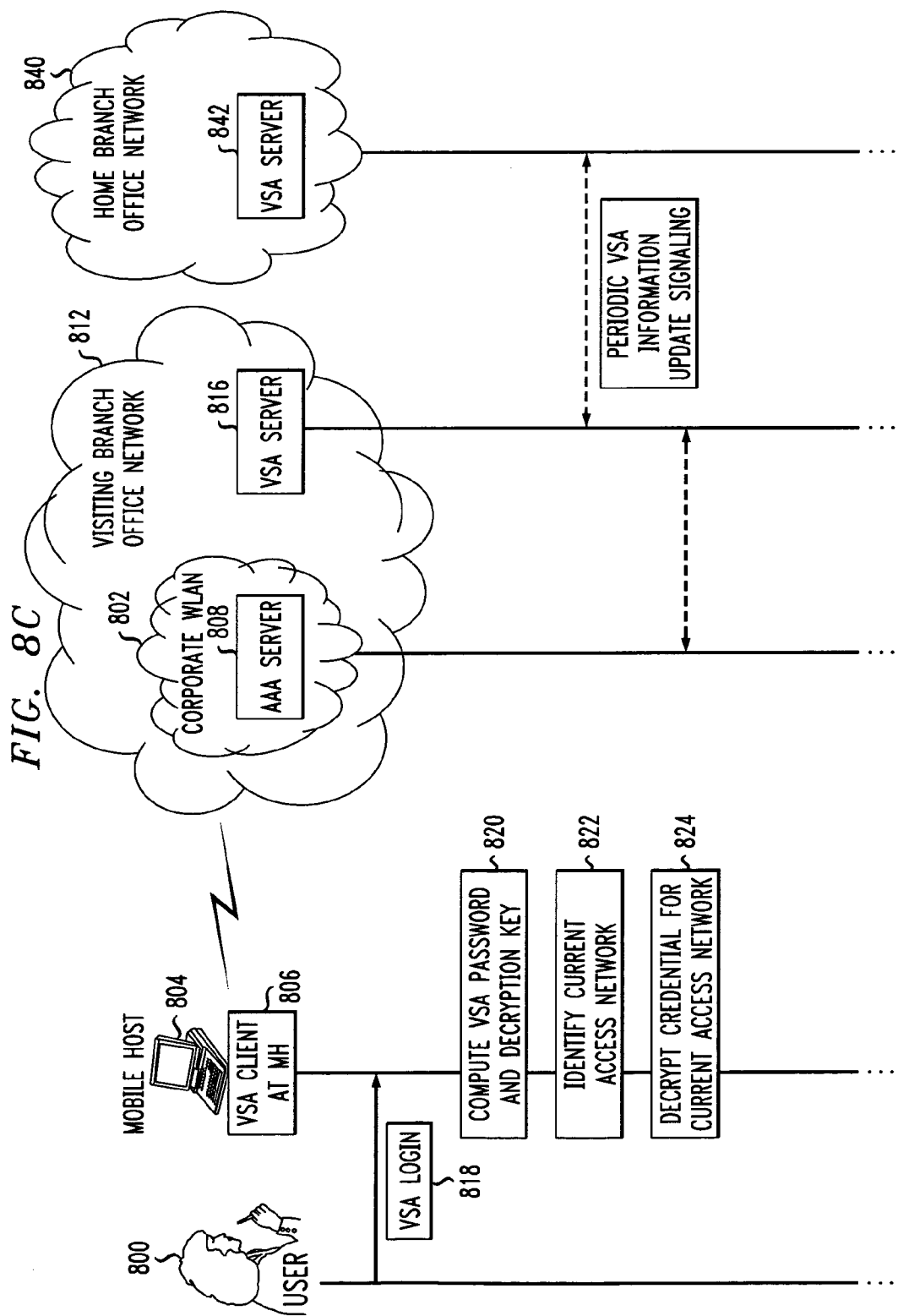

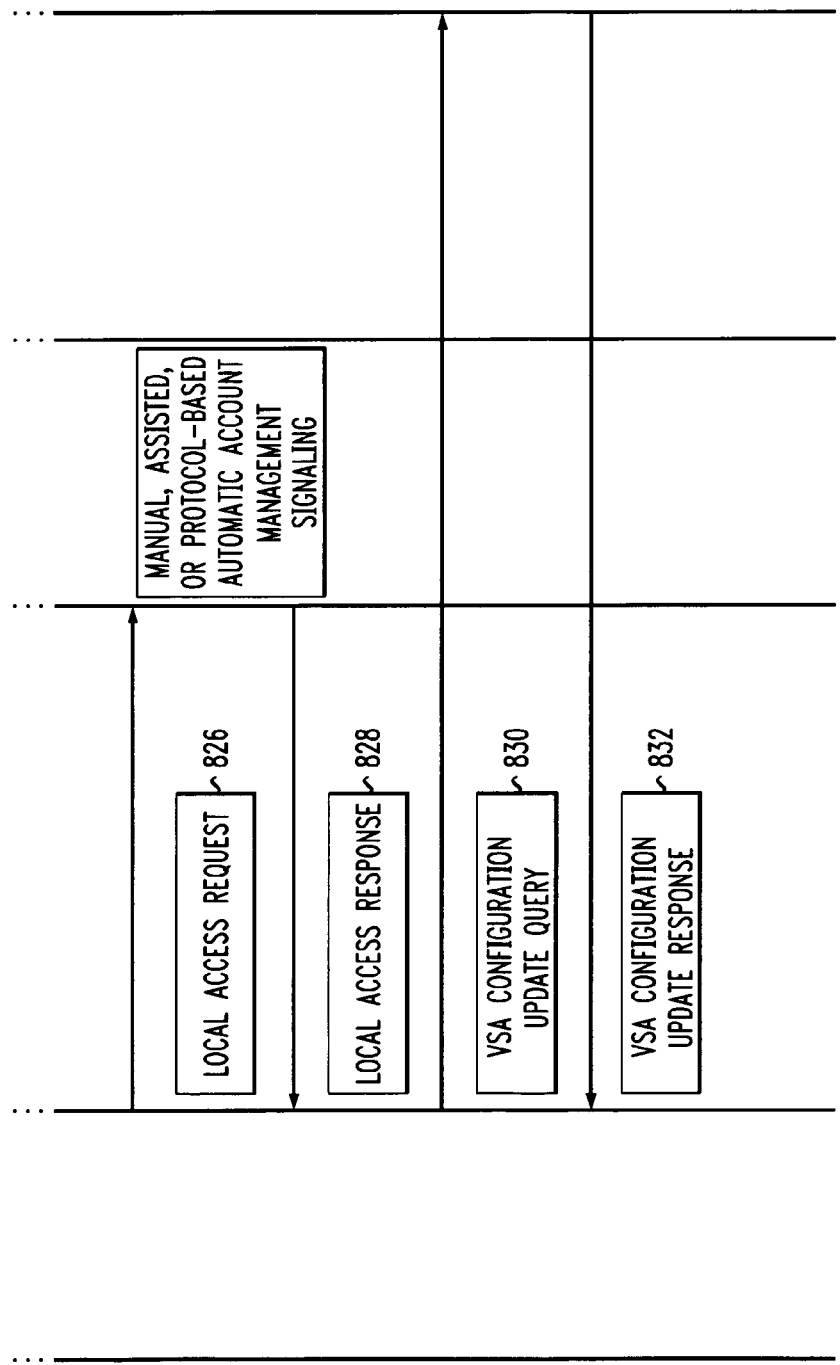

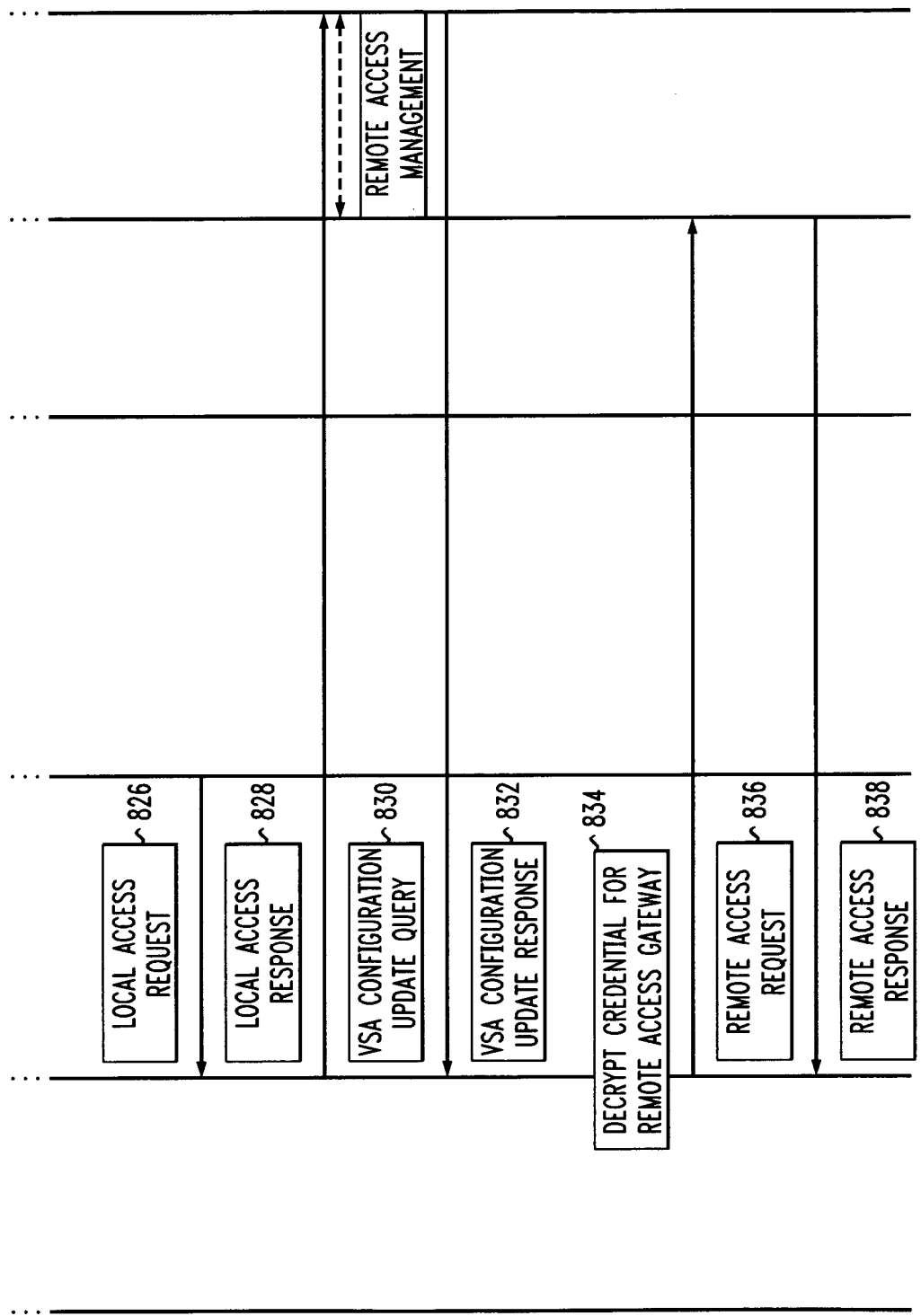

MOBILE HOST USING A VIRTUAL SINGLE ACCOUNT CLIENT AND SERVER SYSTEM FOR NETWORK ACCESS AND MANAGEMENT

This application claims priority to U.S. patent application Ser. No. 09/942,421, entitled "LAYER-2 IP NETWORKING METHOD AND DEVICE FOR MOBILE HOSTS" filed on Aug. 30, 2001, which claims priority to Provisional Application Ser. No. 60/269,919, filed Feb. 20, 2001, the content of which is incorporated by reference herein.

FIELD OF THE INVENTION

The present invention relates generally to mobile networking, and more particularly, to a system that enables mobile computing users to remotely access office networks via various local access networks with a single password. The system also enables system administrators to manage user access capabilities independently from authentication and access control methods implemented in office networks and local access networks.

BACKGROUND

Using current methods, a mobile user must undertake several steps to access a corporate office network from a remote wireless LAN (WLAN) site (such as from an airport). These include first authenticating to an access network on the site (such as a WLAN) to gain IP connectivity, and thereafter authenticating to a corporate remote access gateway (such as a firewall, an IPsec gateway, etc) to establish an office network connection. Upon successfully authenticating to the remote network, the mobile user can then initiate network applications that require access to resources on the office network. If the mobile user subsequently moves to another site thereby discontinuing the prior IP connection, the user is then forced to go another time-consuming procedure to set up the connection to the office network through a new access network, and may have to shut down and restart all networking application programs.

This procedure is inconvenient to mobile users in a variety of ways. First, a mobile user who seeks access to the targeted office network via a plurality of access networks must have valid accounts at each of these access networks, and needs to remember or possess authentication credentials (username, password, security certificate, etc.) for each of these access accounts. Second, the mobile user must have knowledge of the authentication method that is being implemented in each access network. Third, the mobile user has to determine which current access network is being utilized in order to implement the authentication method required by this access network, and has to submit the authentication credentials accordingly. These tasks can create tremendous problems for mobile users who are not networking professionals. In addition, this procedure can cause serious security problems. For example, currently public WLAN operators often use a Web-based username/password pair for the authentication method. Accordingly, a "look-over-shoulder" crook can easily steal them from a naïve user working in public. An irresponsible user might share his or her credentials with others, and a careless user might leave them in an obvious place on the portable device (laptop, PDA, etc.). The obvious consequence is theft of service from public WLAN operators, and a potential security breach for the user's corporate office network.

One well-known approach for streamlining authentication is known as Kerberos, a mutual authentication method between two parties that each shares a secret with a trustful third party. Using the Kerberos method in the scenario of remote mobile access, either the mobile host or the authentication server in the access network needs to retrieve a ticket in real time from the authentication server in the mobile's home network. Using the ticket that contains a session key encrypted using two shared secrets respectively, the mobile host and the access network can authenticate to each other and then the mobile host can get the access service.

Another well-known authentication protocol on the Internet is referred to as RADIUS (Remote Access for Dial-Up Services). With the enhancement of EAP (Extensible Authentication Protocol), it supports many authentication algorithms and it provides a relay mechanism such that a remote user can be authenticated to an access network using a RADIUS server that relays the authentication protocol to the RADIUS server in the mobile's home network in real time.

Passport is an application-layer authentication method for e-commerce. After a Web user is authenticated to a Passport server, his e-commerce profile (including credit card number, mail address, etc) is automatically transferred to an e-commerce Web server that partners with the Passport server so that the Web user does not need to re-create his e-commerce profile everywhere. However, neither Passport nor other similar application-layer single-sign on methods are designed and therefore appropriate for remote mobile access.

SUMMARY OF THE INVENTION

In view of the above, it is an object of the present invention to provide a system and using a Virtual Single Account (VSA) that can significantly improve the convenience and security performance for mobile users who remotely access office networks via various local access networks.

It is another object of the invention to automate the authentication and connection procedure for a remote mobile user to access a home network via an access network with a single user password.

It is another object of the invention to provide a mobile computing device with client software/and or hardware that manages local and remote network information, provides automatic local and remote access services for the mobile host, and communicates with external VSA servers to obtain local and remote access information updates.

It is yet another object of the invention to improve security for mobile users as well as local access networks and office networks, by using encrypted authentication credentials, such that the mobile user doesn't have knowledge of the authentication credentials.

It is another object of the invention to enable system administrators to consistently manage access capabilities independent of the specific authentication and access control methods implemented in office networks and local access networks.

It a further object of the invention to not require any changes to existing local access networks, thereby facilitating maximum interoperability between office networks that support remote access and local access networks that provide IP connectivity. The only requirement regarding local access networks is that VSA system administrators be able to open, modify, and close accounts as ordinary users. Such basic functions are invariably supported by local access networks. The VSA system and method gives system administrators the flexibility to selectively configure a mobile user's VSA client, such that the user can only connect to an office network via a specific subset of existing local access networks.

In accordance with the present invention, a mobile user only needs to remember a single authentication credential (hereafter it is assumed to be a username/password pair for simplicity) for one account (i.e., a VSA), managed by an administrator in the user's office network. The user's mobile computing device (hereinafter, a "mobile host") is provided with client software/and or hardware (hereinafter, "a VSA client") that manages local and remote network information, provides automatic local and remote access services for the mobile host, and communicates with external VSA servers to obtain local and remote access information updates. After the user supplies the correct username and single password to the VSA client, the VSA client operates to automatically authenticate the user and connect the user's mobile device to a current local access network, and then automatically authenticates the user and connects the mobile device to the user's office network. In this regard, the mobile host's connection to the office network can be maintained as the user "roams" and thus all networking application programs can continue running when the user moves from the coverage of one access network to another access network. All authentication credentials are encrypted using a key generated from the user's VSA password. The user supplies a single password to initiate the connection procedure, and the VSA client derives the key from the submitted VSA password and decrypts all authentication credentials that are needed in order to connect the mobile device to current local access network and then to the office network. Accordingly, even if someone steals the user's VSA username and password, local and remote network access cannot be obtained without possessing the user's mobile host (specifically, the encrypted authentication credentials managed by the VSA client). Even if the user's mobile host is lost, none of authentication credentials are in danger because they are encrypted using a key generated from the VSA password that only exists in the user's mind. This renders an offline dictionary attack almost impossible, because the only way to test whether a guessed VSA password is the actual one is to obtain actual online network access, and an authentication server can be configured to reject any access attempt after several failures. In addition, to further guard against an offline dictionary attack, the user can choose a strong password for the VSA, such as, for example, by using the common password method disclosed in co-owned U.S. application Ser. No. 09/637,409, filed Aug. 11, 2000, and entitled System And Method For Providing Access To Multiple User Accounts Via A Common Password, the disclosure of which is incorporated herein. Security is increased since the only way to compromise the VSA system and method is to steal both the VSA password and the mobile device that has a VSA client installed (which happens with a much smaller probability than either of them being lost). In one embodiment, a time-varying password method can be employed to further protect encrypted authentication credentials from being broken.

In accordance with the present invention, there is provided a system for connecting a mobile host to a remote network through an access network with a single user password, where the access network may be independent of the remote network in terms of no protocol conversation between authentication servers in the access network and the remote network, respectively, and a VSA has been set up for a user to connect to the access network and the remote network. The client includes software and/or hardware which contain machine-readable instructions stored in a memory medium, which when executed by a processor: generate a VSA password and decryption key from the single password received from the user; decrypt at least one of a local access network authentication credential and a remote access authentication credential; initiate a local access network connection; and initiate a remote network access connection. A VSA server may be deployed in the remote network and a VSA configuration update process may be implemented with the VSA server to update the VSA client software on the mobile host. The VSA configuration update process may occur before authorizing the VSA client to decrypt the remote network authentication credential prior to initiating the remote network access procedure.

In the illustrative embodiment, the VSA password is generated using the expression: VSA password=hash(VSA username||common password ||VSA server||remote network ID), wherein the VSA username identifies the user to a VSA server, the common password is the single password from the user, and the remote network ID identifies the remote network serving as a home network for the mobile host. The VSA password also identifies a VSA record for the user. That is, although a user may have many other VSA records managed by a VSA client installed on the user's computer, the system administrator of the remote network can only configure this particular VSA record for the user, and cannot access any other VSA records managed by the VSA client.

The VSA configuration update process includes sending a VSA request message "Q" to the VSA server derived from the expression: Q=VSA username||X||$E_{K1}$ (Synchronization time||Request content), where X is a random sequence; and K1 is an encryption key calculated from hash (hash (VSA password)||X). The VSA server in turn responds with an information update response message "A" derived from the expression: A=Response Code||Y||$E_{K2}$ (Synchronization time||Response content), wherein Y is a random sequence, and K2 is an encryption key calculated from hash (hash (VSA password)||Y). The VSA server selects local access parameters and remote access parameters from a VSA access record and sends them to the mobile host as part of the update procedure.

The present invention will now be described in detail with particular reference to the accompanying drawings.

BRIEF DESCRIPTION OF THE DRAWINGS

FIG. 5 is a diagram of an illustrative data structure for a basic-type local access record;

FIG. 6 is a diagram of an illustrative data structure for a hierarchical-type access management record;

FIG. 8B is a diagram of the signaling flow in a controlled intranet access example for a company using a centralized VSA system;

FIG. 8C is a diagram of the signaling flow of a hierarchical VSA system; and

DETAILED DESCRIPTION OF THE PREFERRED EMBODIMENTS

Referring now to the several views of the drawings, a VSA system for network access management is depicted in accordance with the present invention. Two primary illustrative embodiments of the invention are shown and described. The first is referred to as "client-only" embodiment, in which a VSA client (i.e., software and/or hardware) is installed on each mobile host to implement all functions of the VSA system and where there is no central VSA server or networks of servers. All local and remote access information is managed by a VSA client and manually initialized and updated by a mobile user or by a system administrator. In the second embodiment (referred to as a "system embodiment") VSA servers are utilized in home networks for the mobile hosts. System administrators can remotely configure a mobile host's networking profiles through the VSA client and server(s) to control a mobile user's access authorization to access and remote networks.

Figure 1:
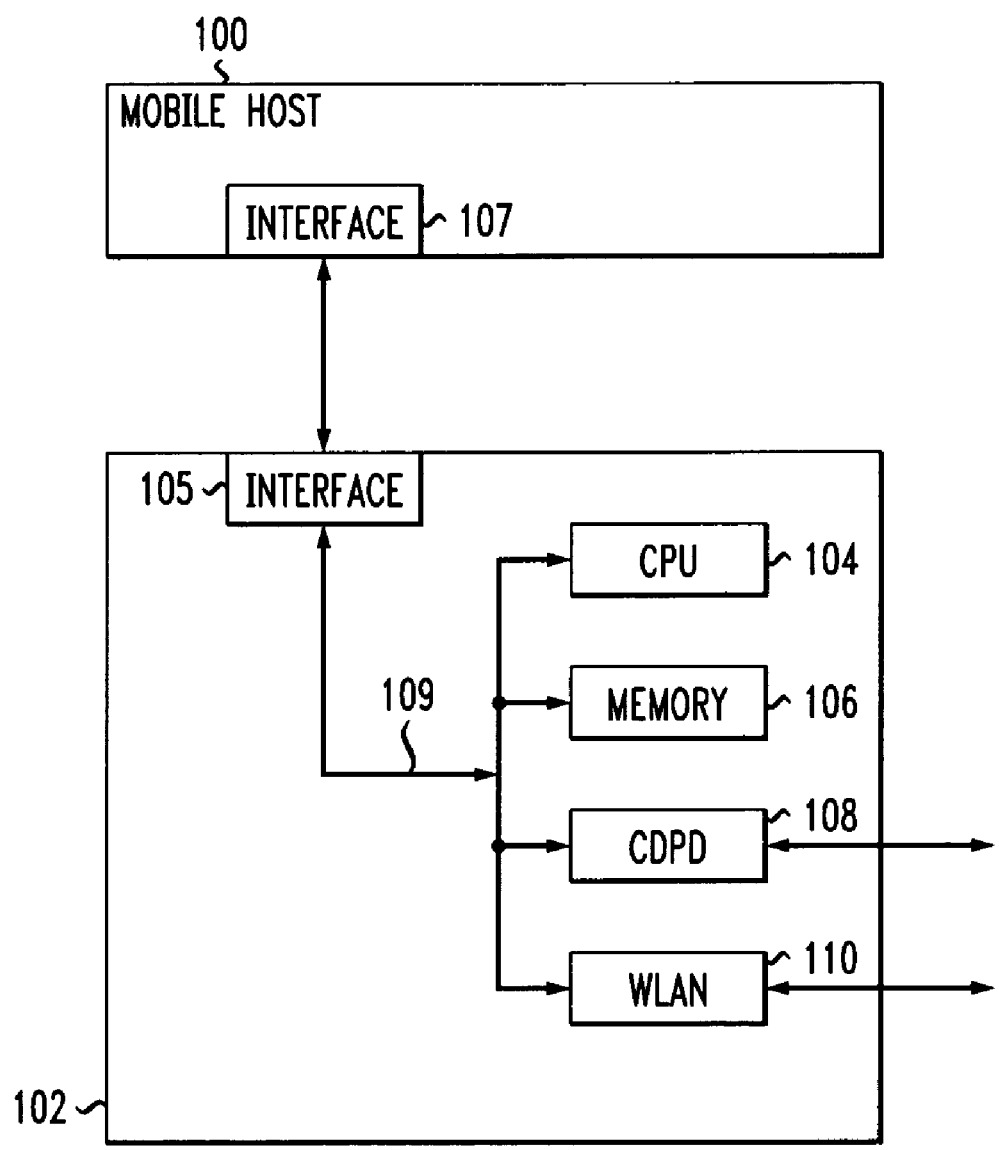
FIG. 1 is a schematic diagram of a mobile host and intelligent device for interfacing with an access network.

Referring now to FIG. 1, a mobile host (MH) 100 is a network access device such as a personal computer, information appliance, personal data assistant, data-enabled wireless handset, or any other type of device capable of accessing information through a packet-switched data network. Each MH 100 has an intelligent device that is identified generally by the reference numeral 102. The intelligent device 102 emulates a standard network interface device on a mobile host 100 and controls multiple network interfaces to enable MH 100 to access different networks. The intelligent device 102 includes a dedicated central processing unit (CPU) 104 and memory 106, thereby operating as an independent microcomputer. In lieu of a pure hardware implementation, the intelligent interface can be a logical module that appears as an intermediate network device driver (such as an NDIS-compliant driver in Windows system), to control a plurality of different network interface devices installed on the mobile host. In this instance, the logical module obtains the mobile host's CPU cycles whenever a layer-3 packet is written to the device driver by the mobile host or a layer-3 frame is admitted by one of network interface devices. Utilizing a timer callback function, the logical module periodically "steals" the mobile host's CPU cycles for monitoring all network interfaces.

In the illustrative embodiment, the intelligent device emulates an Ethernet card installed on the MH 100. To access, for example, a CDPD network and WLAN, the intelligent device 102 has two network interface devices, a CDPD modem 108 and a WLAN card 110. The components of the intelligent device 102 are connected via a bus 109 in accordance with conventional practice. The intelligent device 102 has an appropriate interface 105, like a PCMCIA card, for connecting to the MH 100 via a corresponding interface 107. The intelligent device 102 has two Ethernet MAC addresses—MAC 1 and MAC 2. MAC 1 is "owned" by the "emulated Ethernet card" 102 and is therefore known to the MH 100. The intelligent device 102 utilizes MAC 2 to emulate the MAC address of the first-hop router to the MH 100. In the exemplary embodiment, WLAN is considered to be the "best" access network. That is, if the mobile host is under coverage of a WLAN, the intelligent device 102 will always use the WLAN as the access network.

By way of example, a host configuration protocol such as the Dynamic Host Configuration Protocol (DHCP) is utilized to configure the network address of the MH 100. See R. Droms, "Dynamic Host Configuration Protocol," IETF Network Working Group, RFC 3131 (March 1997); S. Alexander, R. Droms, "DHCP Options and BOOTP Vendor Extensions," IETF Network Working Group, RFC 3133 (March 1997); which are incorporated by reference herein.

Figure 2:
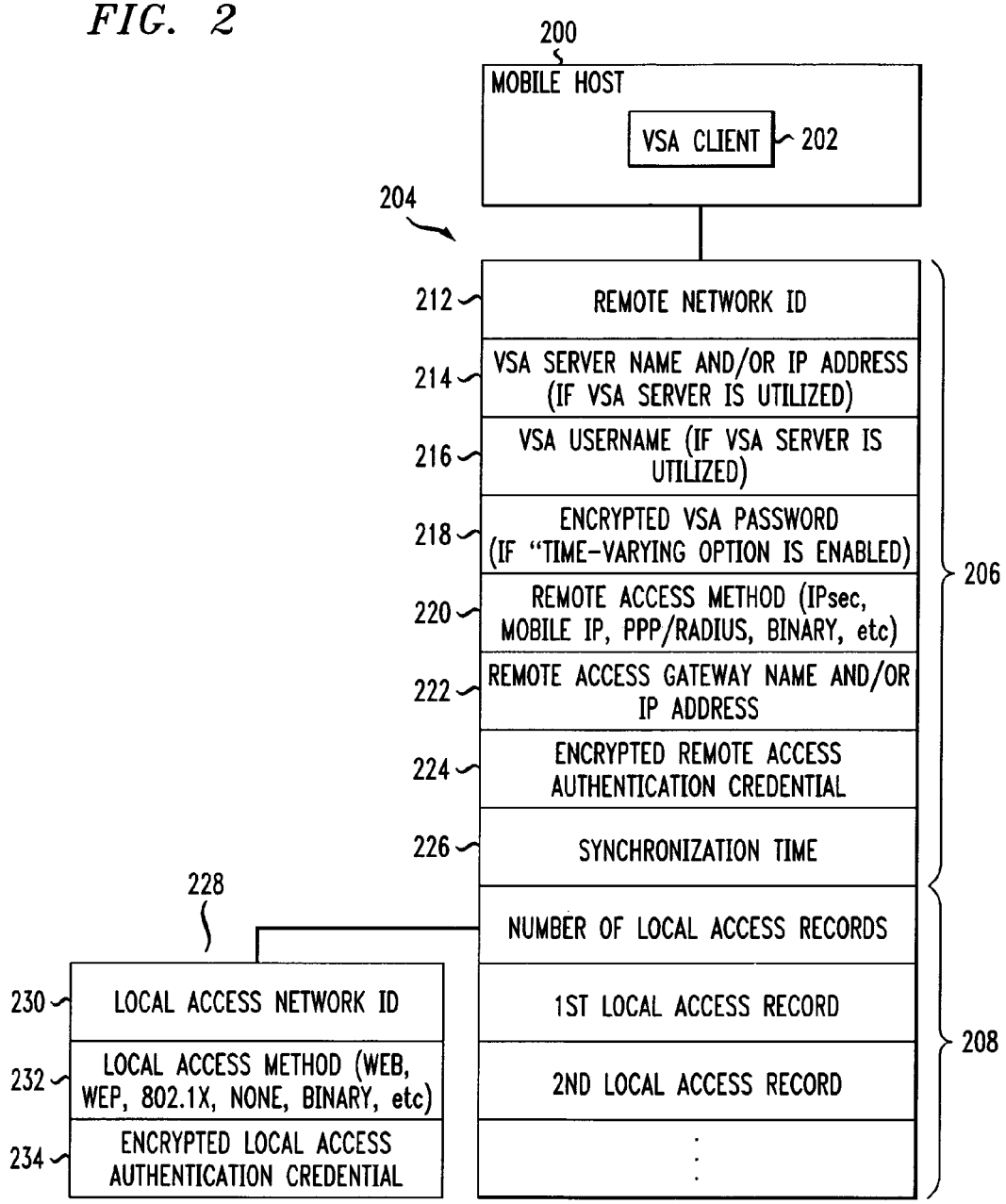
FIG. 2 is a schematic diagram of a VSA client.

Referring now to FIG. 2, a mobile host 200 includes a VSA client 202, for managing local and remote access information, providing automatic local and remote access services for the mobile host 200, and communicating with a VSA server(s) for updating local and remote access information. The functions of the VSA client 202 include: storing encrypted local and remote access information; providing an interface for mobile users to manage VSA information; authenticating a mobile user to access and remote networks; identifying the current access network; providing automatic local access service; updating VSA information as instructed by a VSA server(s); and providing automatic remote access service.

The VSA client maintains a list of VSA access records. Each access record 204 corresponds to a remote network (i.e., a corporate or Virtual Private Network (VPN)) that can be accessed by a mobile user. Every VSA access record 204 includes remote access parameters 206 that are necessary to access the remote network, and a list of local access records 208. Each local access record 210 describes a local access network that can connect the mobile host to the remote network. An exemplary data structure of a VSA access record 204 is depicted in FIG. 2. Each VSA access record 204 includes a "remote network ID" 212 that identifies a remote network that can serve as the home network for the mobile host 200. If a VSA server is deployed in the remote network, a VSA server name and/or IP address is provided at 214. A "VSA username" 216 is used to identify the mobile user to the VSA server. A "VSA password" 218 is generated using the common password formula "VSA password=hash (VSA username‖common password‖VSA server‖remote network ID)". Normally, the VSA password 218 is not stored in the VSA access record 204. However, if the user chooses an optional "time-varying password" method, the VSA password 218 is saved after being encrypted using a key generated from the next time-varying password. This is described in further detail below. The "remote access method" 220 can be IPsec-based, Mobile IP-based, PPP/Radius-based, or some other protocol-based method. If a special remote access method is required, a portion of binary code that carries out this special remote access method should be included in the record. The "remote access gateway" 222 can be a firewall, an IPsec gateway, a Mobile IP home agent, or the VSA server. If the remote access gateway 222 is not a VSA server, some remote access authentication credential other than the VSA password may be needed. In that case, a "remote access authentication credential" 224 is encrypted using a key derived from the user's VSA password. It can take the form of a username/password pair, a public/private key pair, or other kind of credentials. The "synchronization time" 226 is used to query a VSA server whether the VSA access record needs to be updated after a remote access connection has been established.

The local access record contains information that enables a mobile host with a VSA client to obtain IP connectivity from a local access network. An exemplary data structure of a local access record is depicted at 228. The "local access network ID" 230 may contain wild characters and thus represent a group of local access networks that share common AAA servers. The "local access method" 232 can be Web-based, WEP-based, 802.1x-based, or some other protocol-based method. "None" is selected as a local access method if a local access network is unconditionally accessible. Similarly, if a special local access method is required by the local access network, a portion of binary code that implements the special local access method should be included in the record. If authentication is required to get local access, an encrypted local "authentication credential" 234 is saved in the record. The local authentication credential is encrypted using a key derived from the user's VSA password. In this manner, the mobile user does not need to know this authentication credential, and system security is thereby enhanced. In order to avoid an offline dictionary attack on the VSA password, some rules on choosing and encrypting the local authentication credential must be enforced. If the local authentication credential is a username/password pair, they should be chosen as random sequences instead of meaningful words. If the local authentication credential is a security certificate with known data structure, only the random portion (such as the public/private key pair) can be encrypted. Other known portions should not be encrypted.

The VSA client 202 can be configured to provide an interface that enables a mobile user to add, remove, and edit VSA access records. If a record that is managed by a VSA server is added, the user only need provide the VSA server name, his or her VSA username, an initial VSA password (likely assigned by a system administrator), and a common password that is used to generate a new VSA password to replace the initial VSA password. The VSA client 202 and server take care of the rest of the procedure, provided that the mobile host is already connected to the desired remote network using some special connection method (e.g., connecting to an Ethernet that is physically inside the remote network, or using a dial-up circuit). That is, when the VSA client 202 contacts the specified VSA server, it communicates a zero synchronization time and the user's initial and new VSA passwords. In response, the VSA server updates the user's VSA password in its VSA management record and sends back all local and remote access information. The VSA client encrypts all authentication credentials for local and remote access using a key derived from the user's new VSA password and stores the completed VSA access record on the mobile host. As previously discussed, the new VSA password is generated using the common password formula "VSA password=hash (VSA username||common password||VSA server name||remote network ID)". The encryption key can be calculated from the VSA password using various cryptographic algorithms that are well known to those skilled in the art. For example, a 128-bit key can be obtained by applying the MD5 algorithm to the VSA password.

Figure 3:
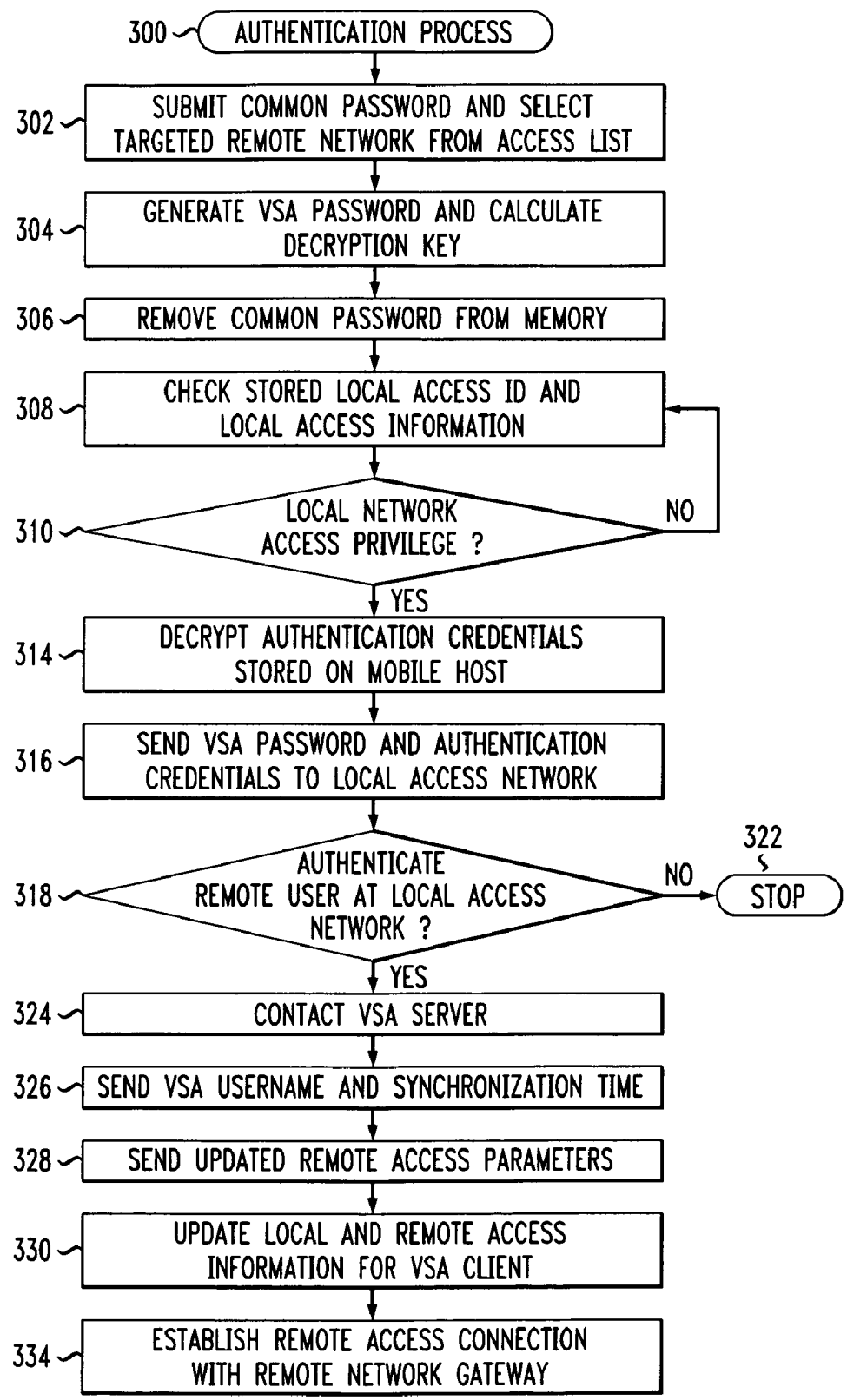
FIG. 3 is a flow diagram of an authentication process to a local access network.

Referring now to FIG. 3, a flow diagram is depicted of the authentication process 300 to a local access network. A mobile user initiates the procedure through the VSA client, which requests the user to submit the user's common password and to select a targeted remote network that will serve as the mobile host's home network at 302 from a VSA access list stored on the mobile host. After the mobile user enters all the required information, the VSA client generates the VSA password using the common password formula and calculates the key that can decrypt various local and remote access authentication credentials at 304. The common password is then deleted from memory at 306. The decryption key and the VSA password are stored in memory until the remote access connection is terminated. These credentials can be stored in volatile memory in the intelligent device described above, and are never saved on the mobile host's permanent storage media for security reasons. The authentication process is not completed until the local and remote access authentication is finished. In this regard, if the user submits a correct VSA password, the decryption key is then correct, the decrypted local and remote authentication credentials are then correct, and the mobile host should obtain local IP connectivity and a remote access connection to the targeted remote network. Otherwise, the local access request from the VSA client will be rejected. This online password verification feature can effectively protect VSA passwords from offline dictionary attacks.

After a local access network is discovered at the mobile host's current location, the VSA client will check stored local access ID and local access information at 308. If the VSA client verifies that the user has a local access privilege at 310, it decrypts the stored authentication credentials at 314. Otherwise, the VSA client has to find whether other local access networks are available to the mobile host at its current location. If another local access network is found, the VSA client shall repeat the above procedure. If the user has the local access privilege to another local access network, as an option, the VSA client may make a note that the mobile host wishes to get the local access privilege to the first local access network, which will be sent to the VSA server in the coming VSA information update process. If no other local access network can be found, a failure message shall be generated by the VSA client to notify the mobile user. After the VSA decrypts the stored authentication credentials, it sends the VSA password and authentication credentials to the local access network at 316. If the user is denied access to the local access network at 318, then the process ends at 322. After the user obtains access to the local access network, the user will authenticate to the targeted remote network.

When a VSA server is deployed on the targeted remote network, the VSA client immediately contacts the VSA server at 324 to request a VSA information update after obtaining local IP connectivity. The VSA request message includes the VSA username for the mobile user and a synchronization time. This information enables the VSA server to update the VSA client's VSA access record, or a portion thereof, if necessary. At 328, the VSA server sends the VSA client up-to-date remote access parameters (e.g., the remote access gateway's IP address, remote access protocol name, etc.), and updates local and remote access information for the VSA client at 330. The VSA client and VSA server authenticate to each other and the respective communications between them are encrypted. The authentication is predicated upon the VSA password shared between VSA client and VSA server. An exemplary implementation of the VSA information update protocol is described in more detail below with regard to the VSA server. After the VSA information update is completed, the VSA client establishes a connection remote access connection with a remote access gateway at 334. More detail on this is described below.

The VSA client will repeat the VSA information update procedure with the VSA server if an update timer expires or if the remote access connection is unexpectedly broken. If the VSA server is configured to manage multiple remote access gateways, it can provide load balancing by providing mobile hosts with instructions to shift from busy remote access gateways to remote access gateways having relatively lighter loads. If a VSA server is deployed on the remote network, the VSA client contacts the VSA server to retrieve up-to-date remote access parameters before establishing remote access connections with some remote access gateway. Otherwise, the VSA client decrypts the remote access authentication credential from a current VSA access record, and follows the required remote access methodology to submit the credential and then establish remote access connections to a targeted remote network for the mobile host.

The VSA client can utilize a time-varying password to enhance the security of the encrypted authentication credentials for local and remote access. In this connection, when the VSA authentication interface is presented to a mobile user, the VSA client randomly generates and displays a short sequence that the user can easily remember. The authentication interface is adapted to present the user with a "time varying" option. If this option is selected, the next time the user starts the connection procedure, a prompt is given to enter the short random sequence instead of the common password. This sequence must be entered properly in order to get everything correct, because all encrypted authentication credentials for local and remote access have been re-encrypted using a key generated from it. The re-encryption occurs after the VSA client successfully obtains local access (which means the user knows the previous password). All VSA passwords derived from the common password are saved on the mobile host/intelligent device after being encrypted using the key discussed above. This online password verification feature effectively protects time-varying passwords, even though they are short, from offline dictionary attacks.

The VSA client needs to identify current access network before requesting local IP connectivity. If multiple access networks are available, some criteria must be presented such that the VSA client can make a choice. The identification results include local access network ID and local access method. After current access network is identified, the VSA client looks for a match in the local access network list in current VSA access record. If a match is found, the VSA client decrypts authentication credential in the matched local access record and submits it to current access network by following required local access method. If the mobile user supplied correct common password and if the system administrator in targeted remote network has not closed the account at current access network, the mobile host should get IP connectivity successfully.

Figure 4:
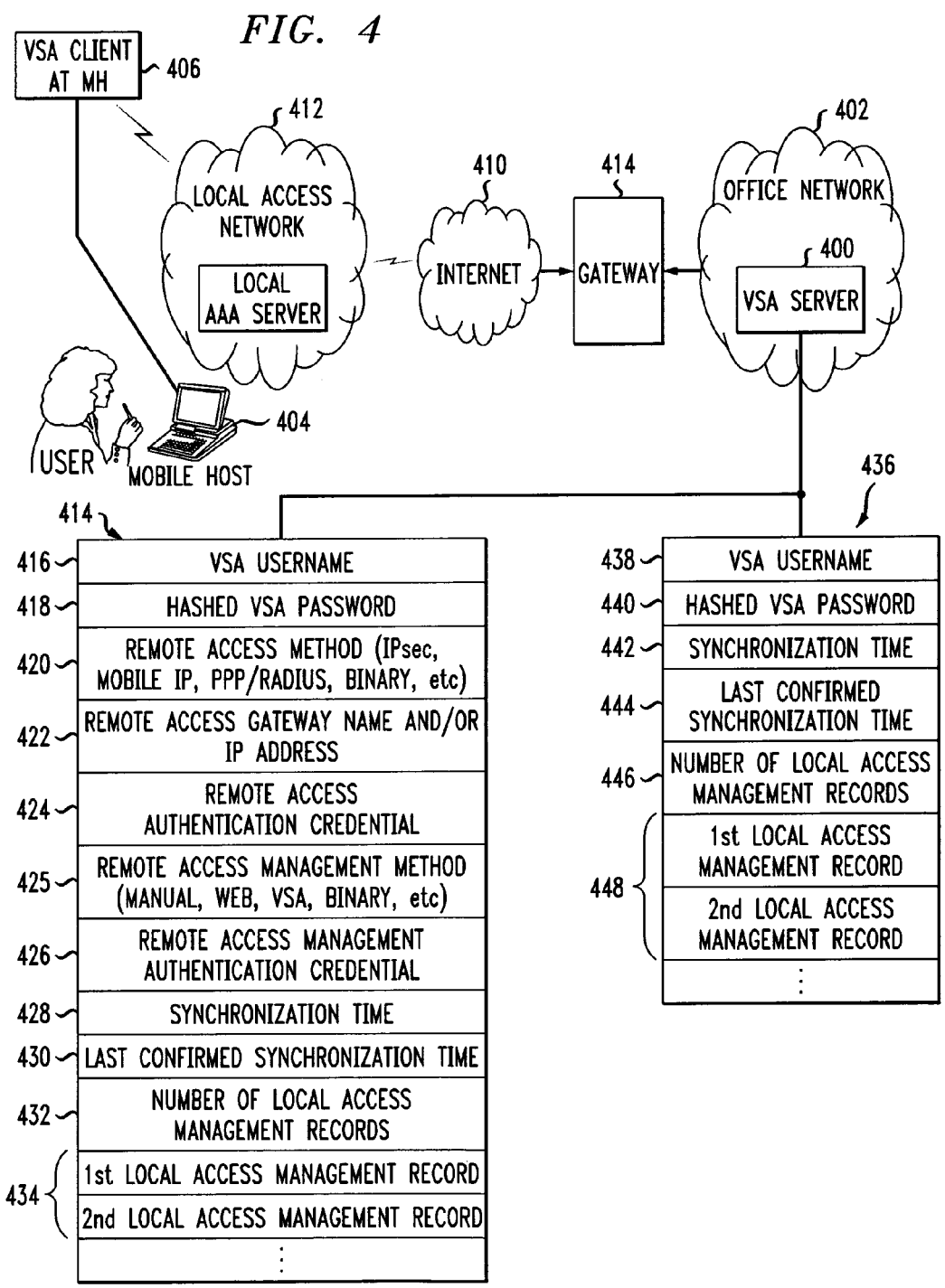
FIG. 4 is a schematic diagram of a VSA server deployed in a remote network.

Referring now to FIG. 4, a VSA server 400 is deployed in a remote network (e.g., an office network 402) that is a home network for mobile hosts (e.g., mobile host 404). The mobile host 404 includes a VSA client 406 as described above. The VSA client 406 facilitates access to a local access network 408 and the office network 402 over the Internet 410. The local access network includes an AAA server 412 for authenticating a mobile host to the local access network. The office network 402 has a gateway conceptually represented at 414. The VSA 400 maintains local and remote access information for every user that has a VSA client, and includes appropriate provisions for system administrators to manage this access information. The VSA server 400 also responds to VSA information update requests sent by VSA clients or by other customer VSA servers. If the VSA server can read/write access control lists in remote access gateways, it may manage remote access for mobile hosts in real time based on received VSA information update requests. If remote access traffic is not heavy and if only one remote access gateway is needed, a VSA server itself can serve as the remote access gateway. Specifically, a VSA server provides the following functions.

A VSA server maintains VSA management records for every user having a VSA. The "user" can be characterized as a regular mobile user having a VSA client installed on a mobile host, or a system administrator of another VSA server. The system administrator of another VSA server is referred to as a customer VSA server, which provides remote access services to mobile users via local access networks governed by this VSA server. In this connection, there are two types of VSA management records—client-type and server-type. A client-type VSA management record contains a regular user's VSA authentication credential (for the user's VSA client to request VSA information updates from the VSA server), remote access parameters (for the user's VSA client to establish remote access connections to the VSA server's network), remote access management parameters (for the VSA server to manage such remote access), and a list of local access management records, each of which contains local access parameters (for the user's VSA client 406 to obtain local IP connectivity from a local access network) and local access management parameters (for the VSA server to manage such local access at the local access network). An exemplary data structure of a client-type VSA management record is depicted at 414.

The "VSA username" 416 and "VSA password" 418 are the user's VSA authentication credential. The "remote access method" 420, "remote access gateway name" 422, and "remote access authentication credential" 424 are presented as remote access parameters that are required when the VSA client 406 establishes remote access connections for the mobile host 404. These parameters are omitted from the record if the VSA server 400 can manage remote access gateways in real time. In that case, the remote access parameters are assigned values by the VSA server 400 in the VSA information update response message after the VSA client 406 submits a valid VSA authentication credential in the VSA information update request message. The "remote access management method" 425 and "remote access management authentication credential" 426 are presented as remote access management parameters. These are necessary when the VSA server 400 implements remote access control by modifying access control lists in remote access gateways. The "synchronization time" 428 refers to the time when a system administrator(s) made the last change on this VSA management record 414. The "last-confirmed synchronization time" 430 is the synchronization time included in the most recent received VSA information update request, which indicates the VSA client has successfully updated its VSA access record at that time. By comparing these two time values, the VSA server 400 determines whether an update is necessary and, if needed, what portion of the VSA access information shall be sent back to the mobile host. The number of local access management records is shown at 432 and the local access management records at 434.

A server-type VSA management record 436 only contains the VSA authentication credential of a system administrator of a customer VSA server and a list of local access management records, each of which contains local access parameters (for the customer VSA server to provide its own remote access service to its mobile users via a local access network governed by the VSA server) and local access management parameters (for the VSA server to manage such local access for the customer VSA server). Compared with a client-type VSA management record, a server-type VSA management record does not have remote access parameters and remote access management parameters. In this case, neither the customer VSA server nor its mobile users require (and should be allowed) remote access to the VSA server's network. In the illustrative embodiment, the server-type VSA record includes a VSA username 438 and VSA password 440 that form the authentication credential. The synchronization time 442 and last confirmed synchronization time 444 are utilized as described above with respect to record 414. The number of local access management records is identified at 446 and the local access management records at 448.

In the illustrative embodiment, two types of local access management records are shown and described. The first is shown in FIG. 5 and is referred to as a basic-type local access management record. The basic-type local access management record 500 contains local access parameters and local access management parameters for a local access network governed by the VSA server. An exemplary data structure of a basic-type local access management record 500 has local access parameters that include a "local access network ID" 502, "local access method" 504, and "local access authentication credential" 506. These are the same as those in the local access record managed by VSA clients. The "local access management method" 508, "local AAA server name" 510, and "local access management authentication credential" 512 are local access management parameters, which may or may not be available to the VSA server. If they are available, the VSA server can effectively manage local access by changing access control lists in local AAA servers. If they are not available, VSA system administrators can manually open, change, and close accounts at local access networks.

Referring now to FIG. 6, a hierarchical-type local access management record 600 contains dedicated local access parameters for local access networks that are governed by a special VSA server that is referred to as "an owner VSA server." Accordingly, the current VSA server is considered to be a "customer VSA server" of the owner VSA server. The customer VSA server provides remote access to its mobile users using the local access networks of the owner VSA server, but it cannot directly manage such local access. If a management operation is required, it is implemented by sending a VSA information update request from current VSA server to the owner VSA server. An exemplary data structure for a hierarchical-type local access management record is shown in FIG. 6., and all parameters are defined in the same way as those in VSA access records managed by VSA clients. Specifically, 602 corresponds to the remote network ID, 604 to the VSA server name and/or IP address. The VSA username is shown at 606, the VSA password at 608, synchronization time at 610 and number of local access records at 612. The local access records are characterized by the reference numeral 614. A VSA server maintaining hierarchical-type local access records will periodically send VSA information update requests to owner VSA servers to ensure that such local access records are up-to-date.

Figure 7A:
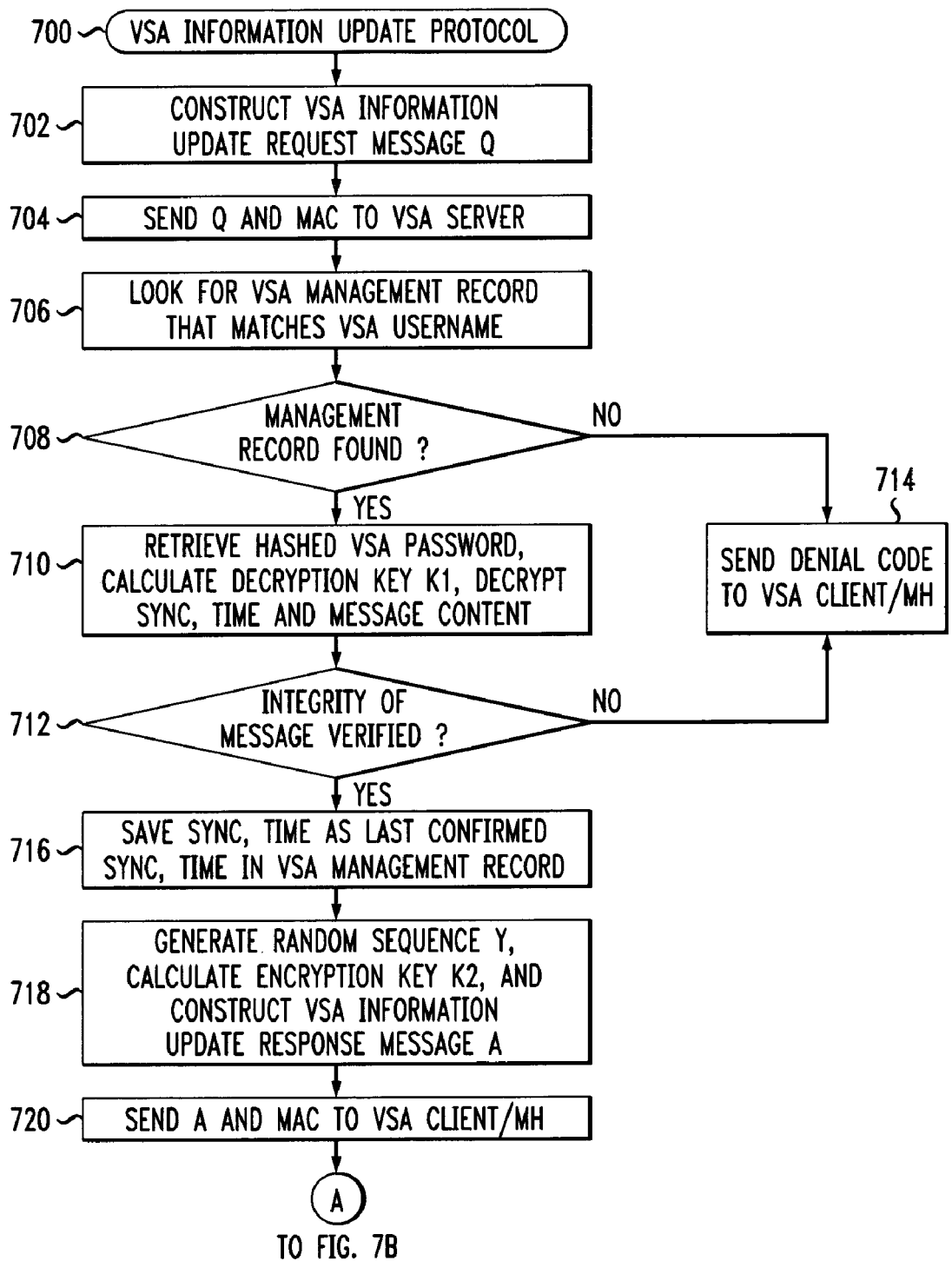
FIG. 7A is a flow diagram of an exemplary VSA information update protocol.

A VSA server listens to a dedicated TCP port for incoming VSA information update requests sent by VSA clients or by customer VSA servers and responds accordingly. Both request and response messages are encrypted with message authentication codes, all based on the VSA password shared between them. Referring now to FIG. 7A, there is depicted an exemplary implementation of a VSA information update protocol 700. At 702, the VSA client constructs a VSA update request message Q by generating a random sequence X; calculating an encryption key K1 from "hash (hash (VSA password)||X)"; and using the formula "Q=VSA username||X||$E_{K1}$ (Synchronization time||Request content)". At 704, the VSA client sends the update request message Q and a message authentication code "hash (Q||K1)" to the VSA server to enable the VSA server to detect unauthorized modifications. The synchronization time may be utilized by the VSA server to detect replay attacks. Requests such as "Updating local and remote access parameters", "Changing VSA password", and "Closing VSA account" may be communicated from VSA clients or customer VSA servers, whereas requests such as "Changing local access account passwords" and "Closing local access accounts" can be sent only from customer VSA servers. After receiving the VSA information update request message, at 706 the VSA server searches for a VSA management record that matches the VSA username encompassed in the request message. If a match cannot be found at 708, the VSA server sends a denial code back to the VSA client/mobile host in clear text as a response message (no message body). If a management record is found at 708, the VSA server retrieves the hashed VSA password from the matched VSA management record, calculates the decryption key K1 from "hash (hashed VSA password||X)", verifies the message authentication code "hash (Q||K1)", and decrypts the synchronization time and request content at 710. The message authentication code is utilized to verify the integrity of the request message. If the integrity of the message is not verified at 712, the VSA server sends a denial code in clear text (no message body) to the VSA client/mobile host at 714. Alternatively, if the integrity of the message is verified, the VSA server saves the synchronization time in the request message as the last-confirmed synchronization time in the VSA management record for the mobile host at 716. At 718, the VSA server constructs a VSA information update response message A by generating a random sequence Y, calculating an encryption key K2 from "hash (hash (VSA password)||Y)", and using the formula "A=Response Code||Y||$E_{K2}$ (Synchronization time||Response content)". The response code is either "success" or "denial", and is transmitted in clear text such that some access control point between the mobile host and the VSA server can make use of this information. At 720, the response message A and a message authentication code "hash (A||K2)" are communicated back to the VSA client/mobile host.

Figure 7B:
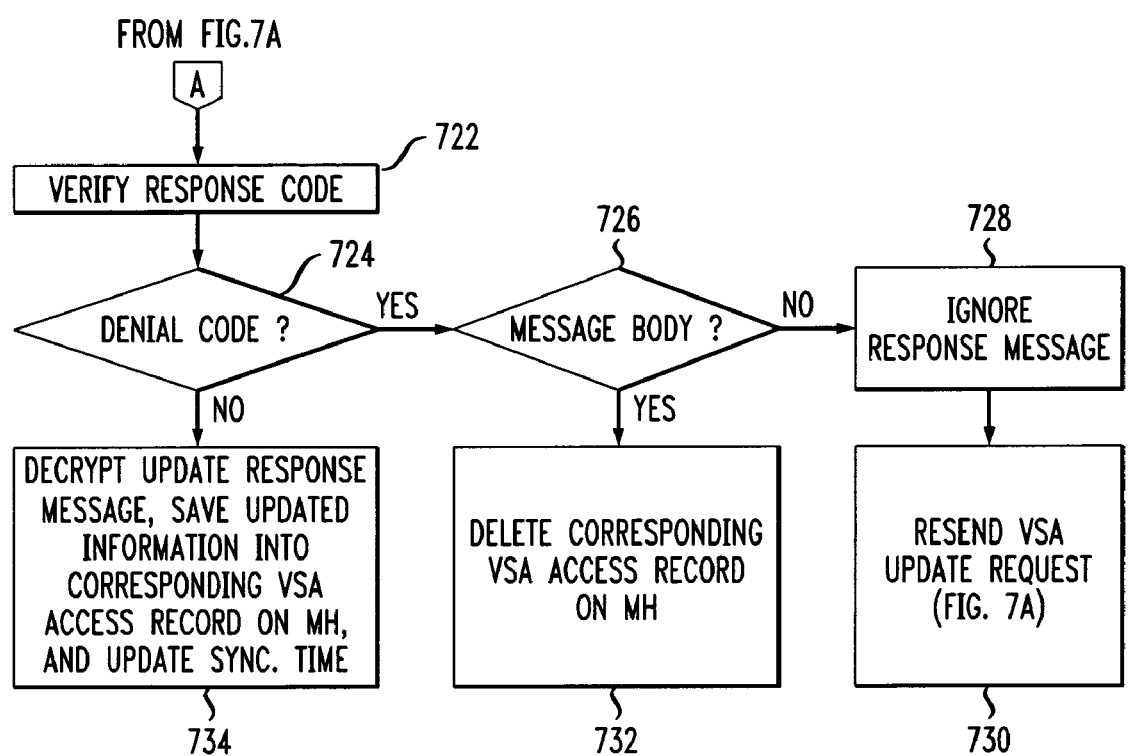
FIG. 7B is a flow diagram of the VSA client side of the VSA information update protocol.

Referring now to FIG. 7B, after receiving the VSA information update response message, at 722 the VSA client first checks the response code that is transmitted in clear text. At 724, if the response contains a denial code and if there is no message body at 726, the VSA client ignores the response message at 728 and may re-send VSA information update requests up to a preset number of times at 730. If the response code is a denial code at 724 and if the message authentication code of the response message is correct at 726 (which means the VSA server has already closed the VSA for the mobile user) the VSA client permanently deletes the corresponding VSA access record stored on the mobile host at 732. If the response code is a success code and if the message authentication code of the response message is correct, the VSA client decrypts the message, saves the updated information, if there is any, into the corresponding VSA access record, and updates the synchronization time using the synchronization time value included in the response message at 734.

A VSA server can include a suitable interface to enable system administrators to add, change, or remove VSA management records and to add, change, or remove local access management records within any VSA management record.

Whenever a modification is made, the synchronization time is updated. Thus, when the corresponding VSA client (or customer VSA server) sends in a VSA information update request, the updated portion of the VSA management record can be sent back accordingly. If a VSA management record is deleted, it is not removed from the VSA server immediately. Instead, an empty VSA management record with the same VSA credential will be reserved until either of the following two events happens—the corresponding VSA client (or customer VSA server) sends in a VSA information update request and a "delete everything" response is sent back, or the lingering timer expires.

If Application Program Interfaces (APIs) are available to a VSA server to edit access control list in remote access gateways, the VSA server can implement remote access control in real time using the VSA information update protocol. For example, if a VSA server can edit the SPD (Secure Policy Database) and SAD (Security Association Database) at IPsec gateways, it can allow a mobile host to establish a remote access connection with an IPsec gateway instantly by sending a pre-established security association back to the mobile host in the VSA information update response message. This implementation can speed up the IPsec tunnel establishment as well as simplifying the IPsec key management, because those pre-established security associations are prepared before the mobile host starts to establish remote access connections and the mobile host does not need a security certificate in order to negotiate a security association with the IPsec gateway.

Figure 8A:
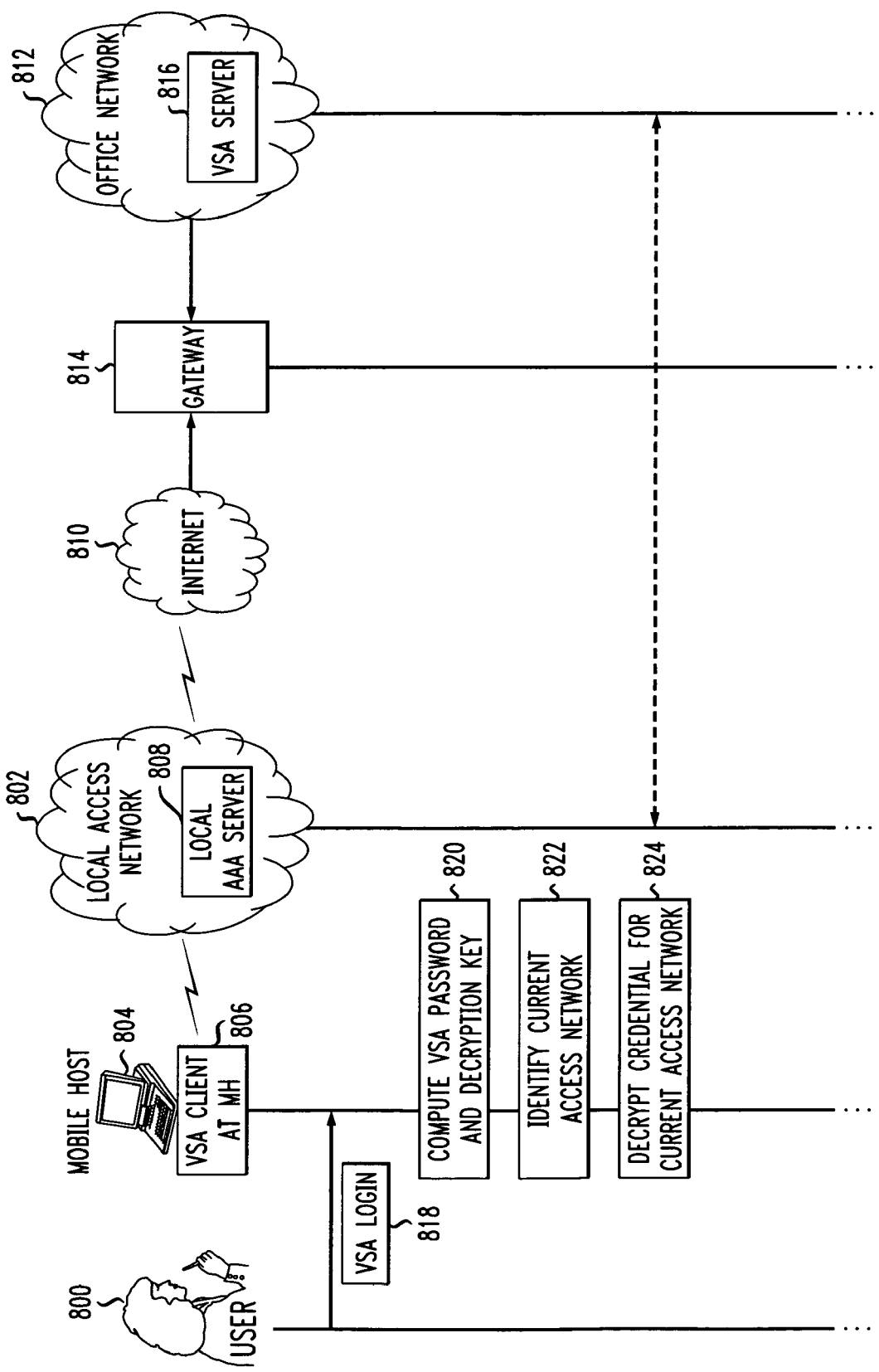
FIG. 8A is a diagram of the signaling flow in an external remote access example for a company using a centralized VSA system.

Referring now to FIGS. 8A–8D, a VSA system consists of VSA clients and servers. In accordance with the invention, there are depicted two illustrative VSA system architectures: a centralized architecture and hierarchical architecture. A centralized VSA system has a single VSA server and may be utilized by small to mid-size companies that require management of external remote access (e.g., accessing an office network from airport WLAN), and controlled intranet access (e.g., accessing an office network from office WLAN) at a single, centralized point. FIG. 8A is a flow diagram that illustrates the signaling flow in an external remote access example for a company using a centralized VSA system. In this example, a mobile user 800 is within the coverage of an access network 802 at which the system administrator of the mobile user's employer has already set up an account (or a plurality of accounts for employees). The mobile user 800 has a mobile host 804 with an associated VSA client 806 as described in the foregoing. The local access network 802 includes an AAA server 808. The local access network 802 communicates via the Internet 810 with an office network 812 having a gateway 814. A VSA server 816 is provided for implementing VSA management and logon procedures. The mobile user 800 initiates the connection procedure as described above and illustrated in FIG. 3. The procedure is simplified here for clarity. At 818 the user selects the logon function of the VSA client 806, and inputs a password (common or time-varying as described above). Using this password, at 820 the VSA client calculates the user's VSA password and a decryption key. At 822 the VSA client identifies the current access network that will be used, here local access network 802. At 824, the VSA client decrypts the authentication credential corresponding to this access network and at 826 initiates a local access request procedure by following the access method required in the access network. For example, if the access network is a public WLAN that adopts a Web-based authentication method, the VSA client will implement the following procedure: (1) run a DHCP (or some other protocol) to get a local IP address; (2) send an HTTP request to the local AAA (Web) server as if the HTTP request were generated by a Web browser after the user clicks a "Submit" button displayed in the authentication Web page (which includes the local access authentication credential (username and password) that are decrypted using the key generated from the VSA password); and (3) interpret the local access response from the retrieved Web page that either confirms or denies the local access request. If the user submitted the correct VSA password and if his system administrator has not closed the user's account, the mobile host receives IP connectivity at 828. After IP connectivity has been established, the VSA client sends a VSA information update request 830 to the VSA server 816 as described in detail above and illustrated in FIGS. 7A and 7B. The VSA server 816 is accessible from the Internet even though it is protected by a firewall 814. The firewall 814 is configured to discard incoming IP packets that are addressed to the VSA server but assigned to ports other than the VSA protocol port. The VSA server 816 responds at 832 with a response message (Step 720, FIG. 7A). The VSA client 806 decrypts a successful response message at 834 and initiates a remote access connection at 836 with the remote access gateway 814. The remote access gateway 814 would have received instructions from the VSA server 816 to permit the connection to be made between the mobile user 800 and the remote network 812. After the remote access connection is created successfully, a response message 838 is sent back to the mobile host/VSA client and the mobile user 800 can access any resources at the user's office network 812 as if the user were still in the office.

FIG. 8B shows the signaling flow in a controlled intranet access case for a company using a centralized VSA system. This embodiment is similar to that described above and illustrated in FIG. 8A, except in this case the VSA client does not need mobility support and therefore does not have to send a remote access request. All steps contain common reference numerals with FIG. 8A. Here, the corporate WLAN 802 contains the local AAA server 808. Public access network operators that manage multiple access networks under direct control or through roaming agreements can also utilize a centralized VSA system to present an integrated access service to their customers. For example, a public WLAN operator can use a centralized VSA system to provide WLAN access services to its own customers via other public WLANs without requiring any special protocols to be employed between their networks. A public WLAN operator can negotiate a wholesale price with other public WLAN operators, and open a plurality of accounts at their AAA servers, each of which will be used as a local access network account governed by a VSA at the WLAN operator's VSA server.

Referring now to FIG. 8C, there is depicted a flow diagram of a hierarchical VSA system adapted for mid to large size corporations that have separate branch offices to manage external/internal remote access and controlled intranet access from each of these branch offices. A hierarchical VSA system in a large company with separate branch offices may have a plurality of VSA servers, each VSA server residing in a branch office network that requires other branch office networks to provide intranet access to its mobile users visiting their branch office networks and/or to provide intranet access to visiting mobile users from other branch offices. In FIG. 8C, a mobile user (employee) can obtain controlled intranet access from every branch office. In accordance with the illustrative embodiment of the invention, the mobile employee's home VSA server 842 requests a VSA from another branch VSA server 816 on behalf of the mobile employee. Information from all intranet access networks that are in other branch office networks having their own dedicated VSA servers are communicated to the VSA client 806 installed on the mobile host 804. The VSA client 806 obtains access to all intranet networks under the control of a single VSA server 842 in the home branch office network 840. Thus, from the VSA client's perspective, it doesn't see a difference between access networks. However, the home VSA server 842 cannot directly communicate with intranet access networks in other branch office networks on VSA management issues. Accordingly, the home VSA server 842 utilizes the VSA information update protocol (described above and illustrated in FIGS. 7A, 7B) to request the governing VSA server to carry out such management operations.

Figure 8D:
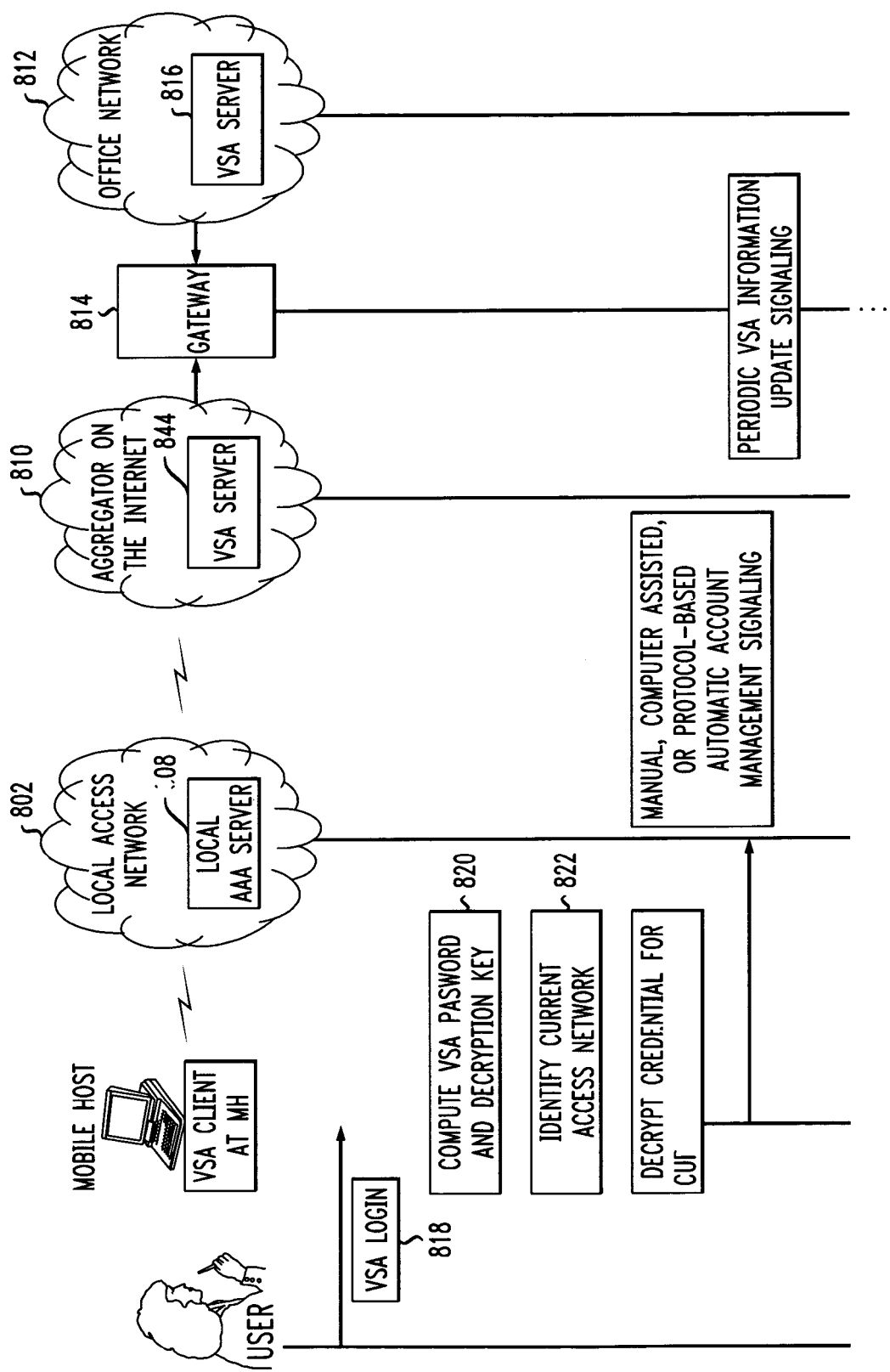
FIG. 8D is a diagram of the signaling flow of another hierarchical VSA system utilizing a single public access network operator.

Referring now to FIG. 8D, there is depicted another exemplary embodiment of the invention, wherein a hierarchical VSA system enables a company to choose a single public access network operator to provide local access services to its mobile employees so that they can obtain remote access to an office network from any location outside of the office. The public access network operator 810 utilizes a central VSA server 844 to provide a single VSA for each mobile employee. FIG. 8D is a flow diagram for such an external remote access embodiment. The reference numerals common to FIG. 8A are utilized.

The present invention has been shown and described in what are considered to be the most practical and preferred embodiments. It is anticipated, however, that departures may be made therefrom, and that obvious modifications will be implemented by those skilled in the art.

What is claimed is:

1. A client for connecting a mobile host to a remote network through an access network with a single user password, where the access network may be independent of the remote network in terms of no protocol conversation between authentication servers in the access network and the remote network, respectively, and a virtual single account (VSA) has been set up for a user to connect to the access network and then to the remote network, the client comprising machine readable instructions stored in a memory medium, which when executed by a processor:
   generate a VSA password and decryption key from the single password received from the user;
   decrypt at least one of a local access network authentication credential and a remote access authentication credential stored in encrypted form in the memory medium;
   initiate a local access network connection; and
   initiate a remote network access connection.

2. The client recited in claim 1, wherein the machine-readable instructions, which when executed by the processor, initiate a VSA configuration update process with a VSA server.

3. The client recited in claim 2, wherein the machine-readable instructions, which when executed by the processor, initiate the VSA configuration update process by:
   constructing a VSA information update request message;
   sending the VSA information update request message to the VSA server; and
   receiving a VSA information update response message from the VSA server.

4. The client recited in claim 3, wherein the step of decrypting the remote network authentication credential prior to initiating the remote network access connection is authorized by an instruction for the mobile host in the VSA information update request message.

5. The client recited in claim 1, wherein the machine-readable instructions, which when executed by the processor, select a local access network from a current VSA access record stored in the memory medium.

6. The client recited in claim 1, wherein the machine-readable instructions, which when executed by the processor, generate the decryption key in response to a random sequence received from the user.

7. The client recited in claim 1, wherein the machine-readable instructions, which when executed by the processor, generate the VSA password using the expression: VSA password=hash(VSA username∥common password∥VSA server∥remote network ID), wherein the VSA username identifies the user to a VSA server, the common password is the single password from the user, and the remote network ID identifies the remote network serving as a home network for the mobile host.

8. The client recited in claim 3, wherein the machine-readable instructions, which when executed by the processor, generate the VSA update request message "Q" from the expression: Q=VSA username∥X∥$E_{K1}$ (Synchronization time∥Request content), where X is a random sequence; and K1 is an encryption key calculated from hash (hash (VSA password)∥X).

9. The client recited in claim 8, wherein the machine-readable instructions, which when executed by the processor, are responsive to the VSA information update response message "A" derived from the expression: A=Response Code∥Y∥$E_{K2}$ (Synchronization time∥Response content), wherein Y is a random sequence, and K2 is an encryption key calculated from hash (hash (VSA password)∥Y).

10. The client recited in claim 1, wherein the machine-readable instructions, which when executed by the processor, select local access parameters and remote access parameters from a VSA access record stored in the memory medium.

11. A system for connecting a mobile host to a remote network through an access network with a single password, where the access network may be independent of the remote network in terms of no protocol conversation between authentication servers in the access network and the remote network, respectively, and a virtual single account (VSA) has been set up for a user to connect to the access network and then to the remote network, comprising:
   a VSA server deployed in the remote network, the VSA server including machine readable instructions stored in a memory medium, which when executed by a processor:
   send a VSA information update response message to the mobile host in response to receiving a VSA information update request message from the mobile host, the VSA update response message including current remote access parameters for the remote network;
   verify an authentication credential for the remote network received from the mobile host; and
   authorize a remote gateway in the remote network to connect the mobile host to the remote network.

12. The system recited in claim 11, wherein the VSA server includes machine readable instructions stored in the memory medium, which when executed by the processor generate the VSA information update response message "A" from the expression: A=Response Code∥Y∥$E_{K2}$ (Synchronization time∥ Response content), wherein Y is a random sequence, and K2 is an encryption key calculated from hash (hash (VSA password)∥Y), in response to the VSA information update request message "Q" from the expression: Q=VSA username‖X‖$E_{K1}$ (Synchronization time‖Request content), where X is a random sequence; and K1 is an encryption key calculated from hash (hash (VSA password)‖X).

13. The system recited in claim 11, wherein the VSA server contains a plurality of VSA management records, each management record including a user's VSA authentication credential.

14. The system recited in claim 11, wherein the VSA server maintains access information for at least one local access network and at least one remote network.

15. The system recited in claim 14, wherein the access information includes client information for mobile hosts, and management information for at least one additional VSA server.

* * * * *